United States Patent
Kronrod et al.

(10) Patent No.: US 12,327,138 B2
(45) Date of Patent: *Jun. 10, 2025

(54) STORAGE SYSTEM WITH EFFICIENT RELEASE OF ADDRESS LOCK WAITERS DURING SYNCHRONOUS REPLICATION

(71) Applicant: EMC IP Holding Company LLC, Hopkinton, MA (US)

(72) Inventors: Svetlana Kronrod, Concord, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1499 days.

This patent is subject to a terminal disclaimer.

(21) Appl. No.: 16/654,225

(22) Filed: Oct. 16, 2019

(65) Prior Publication Data

US 2021/0117235 A1 Apr. 22, 2021

(51) Int. Cl.
*G06F 9/46* (2006.01)
*G06F 3/06* (2006.01)
(Continued)

(52) U.S. Cl.
CPC .......... *G06F 9/5022* (2013.01); *G06F 3/0619* (2013.01); *G06F 3/065* (2013.01);
(Continued)

(58) Field of Classification Search
CPC ........ G06F 9/5022; G06F 9/526; G06F 3/065; G06F 3/067; G06F 3/0619;
(Continued)

(56) References Cited

U.S. PATENT DOCUMENTS 5,678,026 A * 10/1997 Vartti .................. G06F 9/52
 713/400
6,594,774 B1 * 7/2003 Chapman .............. G06F 11/366
 714/48

(Continued)

FOREIGN PATENT DOCUMENTS

| JP | 3832543 B2 * | 10/2006 |
| JP | 3866448 B2 * | 1/2007 |
| WO | 2016111954 A1 | 7/2016 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — April Y Blair
*Assistant Examiner* — Zhi Chen
(74) *Attorney, Agent, or Firm* — Ryan, Mason & Lewis, LLP

(57) ABSTRACT

An apparatus includes at least one processing device comprising a processor coupled to a memory, with the processing device being configured to maintain a synchronous replication input-output (IO) request list having a plurality of entries corresponding to respective synchronous replication IO requests, a given such entry identifying at least a sender component and one or more address locks held by the corresponding synchronous replication IO request. The processing device is further configured to detect a failure of a particular one of a plurality of sender components, to access the synchronous replication IO request list to identify one or more address locks held by at least one synchronous replication IO request previously sent by the failed sender component, and to release one or more address lock waiters that are waiting to obtain the one or more identified address (Continued)

locks. Other embodiments include methods and computer program products.

20 Claims, 6 Drawing Sheets

(51) Int. Cl.
 G06F 9/50 (2006.01)
 G06F 9/52 (2006.01)
 G06F 11/07 (2006.01)
(52) U.S. Cl.
 CPC ............. G06F 3/067 (2013.01); G06F 9/526 (2013.01); G06F 11/0709 (2013.01); G06F 11/0727 (2013.01); G06F 11/0751 (2013.01); G06F 11/0793 (2013.01)
(58) Field of Classification Search
 CPC ............. G06F 11/0709; G06F 11/0727; G06F 11/0751; G06F 11/0793
 See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,176,046 | B1 | 1/2019 | Hu et al. |
| 10,261,693 | B1 | 4/2019 | Schneider et al. |
| 10,320,906 | B2 * | 6/2019 | Slik .......................... G06F 3/067 |
| 10,324,640 | B1 | 6/2019 | Chen et al. |
| 10,338,851 | B1 | 7/2019 | Kronrod et al. |
| 10,437,501 | B1 | 10/2019 | Kucherov et al. |
| 10,437,855 | B1 | 10/2019 | Stronge et al. |
| 10,452,648 | B1 * | 10/2019 | Holenstein .......... G06F 16/2379 |
| 2002/0124146 | A1 * | 9/2002 | Shinkawa ........ G01R 31/31715 711/151 |
| 2005/0063216 | A1 * | 3/2005 | Wilkins .............. G06F 12/0873 711/E12.019 |
| 2006/0259907 | A1 | 11/2006 | Bhatia et al. |
| 2008/0028172 | A1 * | 1/2008 | Takahashi ........... G06F 11/2071 711/162 |
| 2008/0279462 | A1 | 11/2008 | Celi, Jr. |
| 2009/0132955 | A1 | 5/2009 | Garg et al. |
| 2009/0187696 | A1 * | 7/2009 | Roos ................... G06F 13/1647 711/E12.082 |
| 2009/0265352 | A1 * | 10/2009 | Holenstein .......... G06F 16/2336 |
| 2010/0023595 | A1 * | 1/2010 | McMillian .............. G06F 15/17 709/212 |
| 2010/0179941 | A1 | 7/2010 | Agrawal et al. |
| 2011/0191561 | A1 * | 8/2011 | Brassow ................. G06F 12/00 711/E12.001 |
| 2013/0325824 | A1 | 12/2013 | Shoens |
| 2014/0181016 | A1 | 6/2014 | Whitehead et al. |
| 2014/0289483 | A1 * | 9/2014 | Hosoda ............... G06F 12/0835 711/152 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0012869 | A1 * | 1/2017 | Loher ................. H04L 43/0823 |
| 2017/0039234 | A1 | 2/2017 | Wagle |
| 2017/0116302 | A1 * | 4/2017 | Czezatke ............ G06F 11/2094 |
| 2017/0192857 | A1 | 7/2017 | Meiri et al. |
| 2019/0317667 | A1 * | 10/2019 | Killamsetti ............. G06F 16/27 |
| 2020/0125529 | A1 * | 4/2020 | Byers ..................... G06F 13/28 |
| 2020/0278984 | A1 * | 9/2020 | Kaushik .............. G06F 11/2069 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
U.S. Appl. No. 16/037,050 filed in the name of Ying Hu et al., filed Jul. 17, 2018 and entitled "Storage System with Multiple Write Journals Supporting Synchronous Replication Failure Recovery.".
U.S. Appl. No. 16/253,793 filed in the name of Yuval Harduf et al., filed Jan. 22, 2019 and entitled "Storage System with Data Consistency Checking in Synchronous Replication Using Active Snapshot Set.".
U.S. Appl. No. 16/396,897 filed in the name of Anton Kucherov et al., filed Apr. 29, 2019 and entitled "Storage System With Deduplication-Aware Replication Implemented Using A Standard Storage Command Protocol.".
U.S. Appl. No. 16/413,050 filed in the name of Xiangping Chen et al., filed May 15, 2019 and entitled "Storage System with Coordinated Recovery across Multiple Input-Output Journals of Different Types.".

* cited by examiner

| SYNCHRONOUS REPLICATION IN-FLIGHT IO LIST FOR PROCESSING MODULE *i* | | |
|---|---|---|
| IO 1 | SENDER ID | ADDRESS RANGE(S) LOCKED BY IO 1 | OTHER FIELDS |
| IO 2 | SENDER ID | ADDRESS RANGE(S) LOCKED BY IO 2 | OTHER FIELDS |
| ... | | |
| IO N | SENDER ID | ADDRESS RANGE(S) LOCKED BY IO N | OTHER FIELDS |

STORAGE SYSTEM WITH EFFICIENT RELEASE OF ADDRESS LOCK WAITERS DURING SYNCHRONOUS REPLICATION

RELATED APPLICATION

The present application is related to U.S. patent application Ser. No. 16/654,189, filed concurrently herewith and entitled "Storage System with Efficient Release of Failed Component Resources During Synchronous Replication," which is incorporated by reference herein in its entirety.

FIELD

The field relates generally to information processing systems, and more particularly to storage in information processing systems.

BACKGROUND

Conventional storage systems are often configured to utilize multiple journals of different types in conjunction with processing of input-output (IO) requests, such as write requests and/or read requests, received from one or more host devices over a network in an information processing system. For example, journals can be used to account for requests that are currently being processed in a given storage system, also commonly referred to as "in-flight" requests. The journals can be used to recover and replay these "in-flight" requests if necessary. However, problems can arise in conventional storage systems when a given one of a plurality of distributed processing modules fails during synchronous replication. In order to ensure high availability (HA) of the storage system, it is generally desirable to replace the failed processing module and to release any associated resources allocated by the other processing modules for use with the failed processing module as quickly as possible. Unfortunately, address lock waiters can inhibit resource release by the other processing modules and therefore adversely impact the ability of the storage system to respond to the failure and meet the HA goals. A need therefore exists for improved techniques for implementing address lock waiter release responsive to component failures in a storage system.

SUMMARY

Illustrative embodiments meet the above-noted need by providing techniques for efficient release of one or more address lock waiters for one or more address locks held by a first synchronous replication IO request sent by a failed component prior to its failure. In some embodiments, the failed component comprises a particular one of a plurality of distributed processing modules, and the address lock waiters comprise respective other synchronous replication IO requests that are waiting for one or more address locks held by the first synchronous replication IO request. In these and numerous other contexts, illustrative embodiments disclosed herein address and overcome issues that might otherwise negatively impact the ability of the storage system to respond to the failure, thereby ensuring that the storage system can meet its HA goals.

For example, such embodiments advantageously allow a storage system to continue handling synchronous replication IO requests during an HA event, without "tripping" or otherwise interrupting the synchronous replication mode, while also efficiently releasing address lock waiters, thereby ensuring fast recovery from the HA event. In addition, lock fairness is advantageously preserved by illustrative embodiments disclosed herein. Moreover, such embodiments do not undermine the performance of the storage system in handling normal IO requests not related to synchronous replication, or in handling synchronous replication IO requests in the absence of any HA events.

These embodiments illustratively include a clustered implementation of a content addressable storage system having a distributed storage controller. Similar advantages can be provided in other types of storage systems.

In one embodiment, an apparatus includes at least one processing device comprising a processor coupled to a memory, with the processing device being configured to maintain a synchronous replication IO request list having a plurality of entries corresponding to respective synchronous replication IO requests, a given such entry identifying at least a sender component and one or more address locks held by the corresponding synchronous replication IO request. One or more additional or alternative fields can be included in the synchronous replication IO request list in other embodiments.

The processing device is further configured to detect a failure of a particular one of a plurality of sender components, to access the synchronous replication IO request list to identify one or more address locks held by at least one synchronous replication IO request previously sent by the failed sender component, and to release one or more address lock waiters that are waiting to obtain the one or more identified address locks.

The address lock waiters illustratively comprise respective ones of a plurality of other synchronous replication IO requests that are waiting to obtain the one or more identified address locks held by the at least one synchronous replication IO request previously sent by the failed sender component.

In some embodiments, releasing one or more address lock waiters that are waiting to obtain the one or more identified address locks comprises, for each of the one or more identified address locks, identifying a corresponding lock object for the address lock, identifying a queue of one or more address lock waiters associated with the identified lock object, and releasing each address lock waiter in the queue.

Additionally or alternatively, releasing one or more address lock waiters that are waiting to obtain the one or more identified address locks illustratively comprises, for each of the one or more address lock waiters, resuming a corresponding synchronous replication IO request, and indicating a lock acquisition failure for the corresponding synchronous replication IO request in conjunction with the resuming of that request.

The processing device in some embodiments comprises at least a portion of a storage controller of a source storage system. The source storage system is configured to participate in a synchronous replication process with a target storage system, and the synchronous replication IO requests are generated as part of the synchronous replication process.

As another example, the processing device illustratively comprises a particular one of a plurality of storage nodes of a distributed storage system, with each such storage node comprising a set of processing modules configured to communicate with corresponding sets of processing modules on other ones of the storage nodes, and the sets of processing modules of the storage nodes of the distributed storage system collectively comprising at least a portion of a storage controller of the storage system.

In some embodiments, the synchronous replication IO request list is maintained by a particular one of the processing modules of the sets of processing modules of the respective storage nodes of the distributed storage system, and the sender components comprise respective other ones of the processing modules of the sets of processing modules of the respective storage nodes of the distributed storage system. Each of at least a subset of the processing modules of the sets of processing modules of the respective storage nodes of the distributed storage system illustratively maintains a separate corresponding synchronous replication IO request list for that processing module.

Numerous other clustered and non-clustered storage system arrangements are possible in other embodiments.

Maintaining the synchronous replication IO request list in one or more embodiments illustratively comprises receiving IO requests, and for each of the received IO requests, determining if the IO request is a synchronous replication IO request, and responsive to the IO request being a synchronous replication IO request, creating a corresponding entry in the synchronous replication IO request list.

In some embodiments, maintaining the synchronous replication IO request list comprises receiving an indication that synchronous replication of a particular IO request has successfully completed, and responsive to the received indication, removing a corresponding entry from the synchronous replication IO request list.

Additionally or alternatively, maintaining the synchronous replication IO request list illustratively comprises periodically scanning through the entries of the list, and for each of the entries of the list, determining if the corresponding sender component has failed. Responsive to an affirmative determination that the corresponding sender component has failed, one or more associated address lock waiters are released and the synchronous replication IO request list is updated. The periodic scanning is illustratively performed in each of a plurality of iterations triggered in accordance with respective iteration intervals which may be, for example, on the order of 100 milliseconds. Multiple entries of the synchronous replication IO request list are illustratively removed between successive iterations of the periodic scanning, responsive to successful completion of synchronous replication of their respective corresponding IO requests.

These and other illustrative embodiments include, without limitation, apparatus, systems, methods and processor-readable storage media.

BRIEF DESCRIPTION OF THE DRAWINGS

FIG. 3 shows an example of a synchronous replication in-flight IO list utilized in implementing efficient release of address lock waiters during synchronous replication in accordance with the FIG. 2 process.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
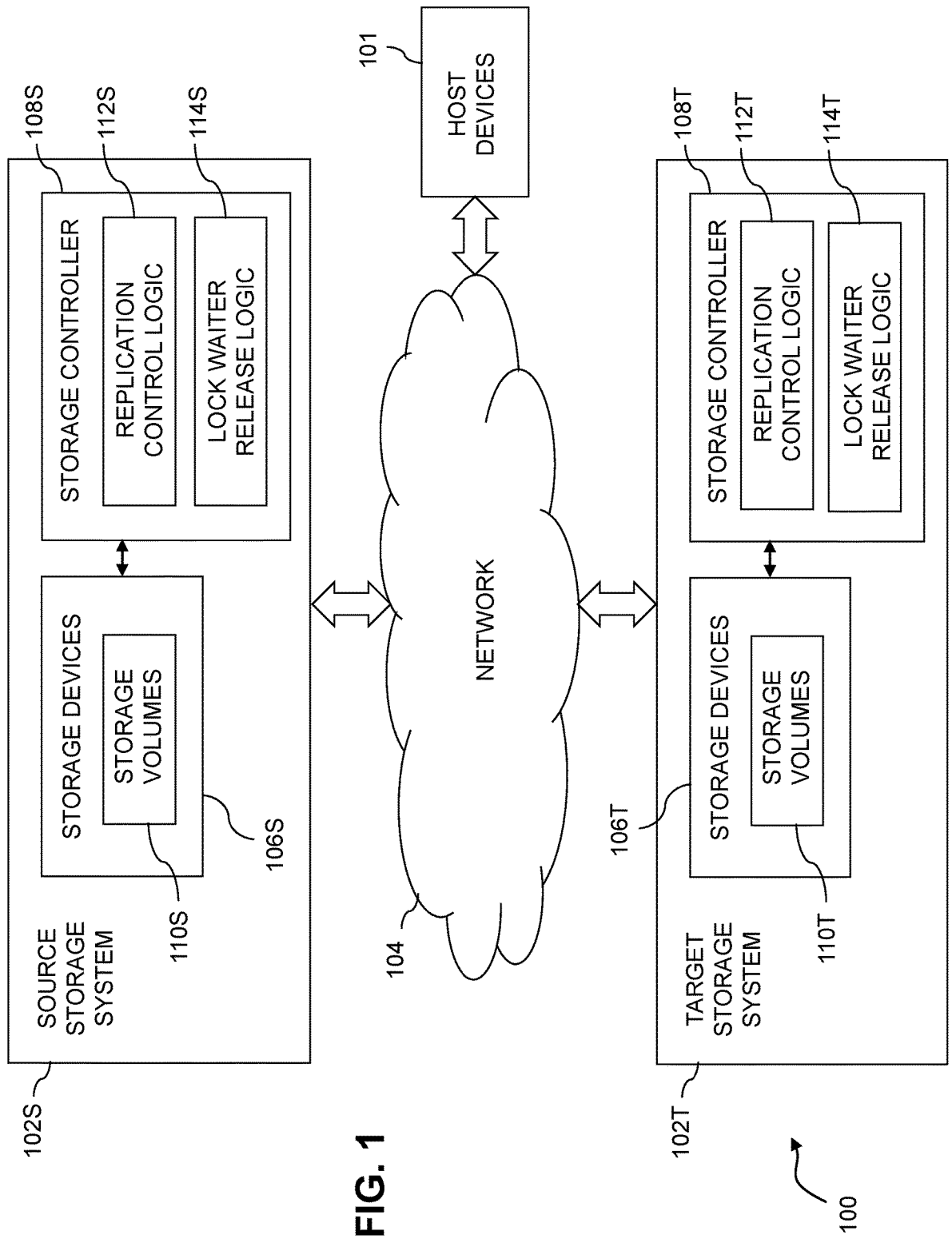
FIG. 1 is a block diagram of an information processing system comprising source and target storage systems configured with functionality for efficient release of address lock waiters during synchronous replication in an illustrative embodiment.

FIG. 1 shows an information processing system 100 configured in accordance with an illustrative embodiment. The information processing system 100 comprises a plurality of host devices 101, a source storage system 102S and a target storage system 102T, all of which are configured to communicate with one another over a network 104. The source and target storage systems 102 are more particularly configured in this embodiment to participate in a synchronous replication process in which one or more storage volumes are synchronously replicated from the source storage system 102S to the target storage system 102T, possibly with involvement of at least one of the host devices 101. The one or more storage volumes that are synchronously replicated from the source storage system 102S to the target storage system 102T are illustratively part of a designated consistency group.

The synchronous replication process can be initiated from another replication process of a different type, such as an asynchronous replication process. Accordingly, the storage systems 102 can transition from asynchronous to synchronous replication, and vice versa.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are replicated from the source storage system 102S to the target storage system 102T in accordance with a synchronous replication process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Massachusetts. A wide variety of other types of storage arrays can be used in implementing a given one of the storage systems 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage systems 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage systems 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage controller 108S of source storage system 102S in the FIG. 1 embodiment includes replication control logic 112S and lock waiter release logic 114S. It can also include additional elements, such as a signature generator for generating content-based signatures of respective data pages.

Similarly, the storage controller 108T of target storage system 102T includes replication control logic 112T and lock waiter release logic 114T. The storage controller 108T, like the storage controller 108S, can also include additional elements, such as a signature generator for generating content-based signatures of respective data pages.

The instances of replication control logic 112S and 112T are collectively referred to herein as replication control logic 112. Such replication control logic instances are also referred to herein as individually or collectively comprising at least a portion of a "replication engine" of the system 100.

The replication control logic 112 of the storage systems 102 controls performance of the synchronous replication process carried out between those storage systems, which as noted above in some embodiments further involves at least one of the host devices 101. The data replicated from the source storage system 102S to the target storage system 102T can include all of the data stored in the source storage system 102S, or only certain designated subsets of the data stored in the source storage system 102S, such as particular designated sets of LUNs or other logical storage volumes. Different replication processes of different types can be implemented for different parts of the stored data.

A given storage volume designated for replication from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding replicated LUN or other storage volume of the storage volumes 110T of the target storage system 102T illustratively comprises at least a portion of a physical storage space of one or more of the storage devices 106T.

Figure 2:
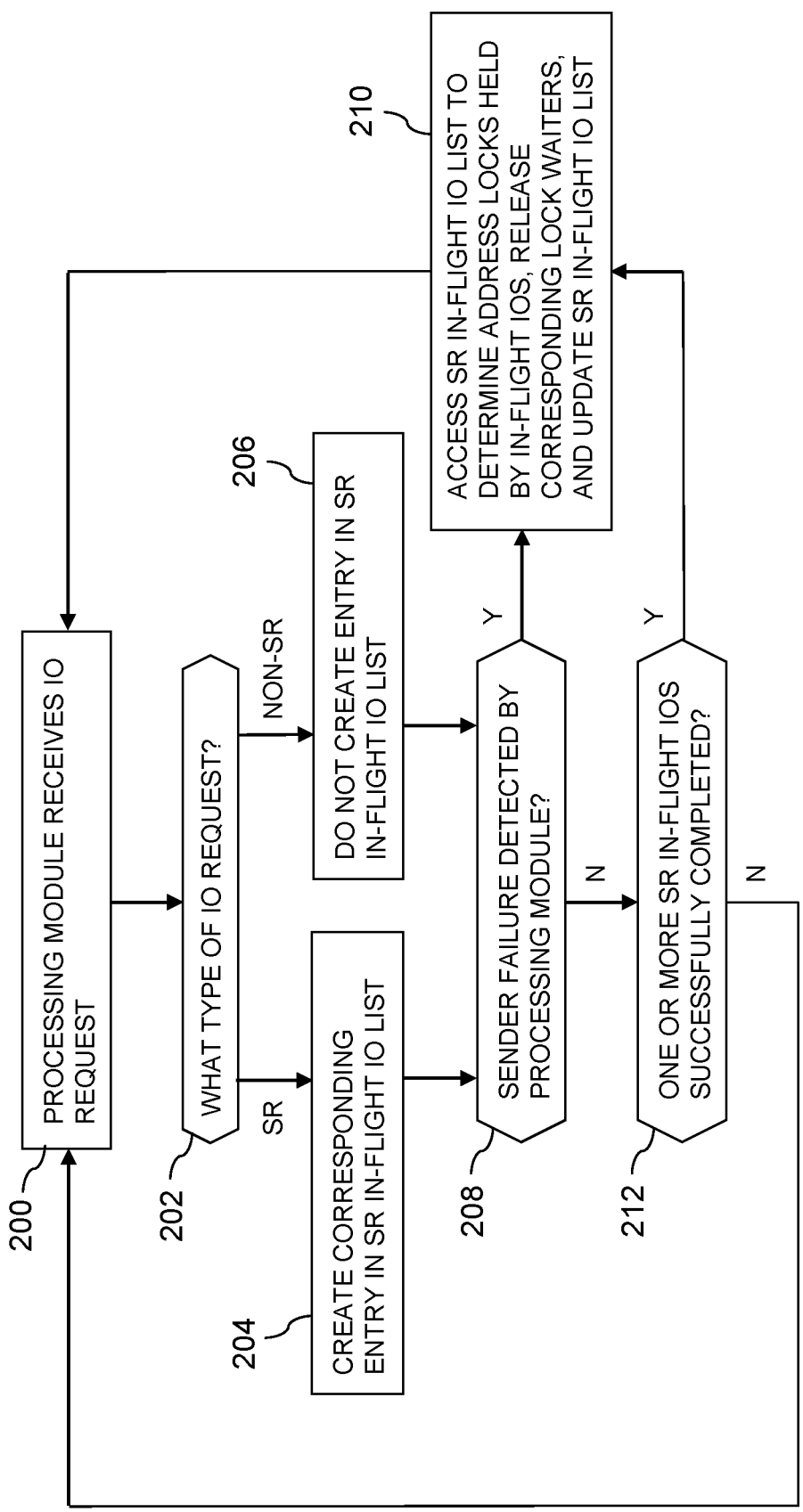
FIG. 2 is a flow diagram of a process for efficient release of address lock waiters during synchronous replication in an illustrative embodiment.

The lock waiter release logic 114 of the storage systems 102 is illustratively configured to control the performance of a process for efficient release of address lock waiters in conjunction with ongoing synchronous replication, such as that shown in the flow diagram of FIG. 2. At least one of the host devices 101 in some embodiments can also include one or more instances of lock waiter release logic and possibly also one or more instances of replication control logic and one or more signature generators.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing synchronous replication process being carried out between the source storage system 102S and the target storage system 102T in the system 100, utilizing their respective instances of replication control logic 112S and 112T.

An exemplary synchronous replication process more particularly comprises a synchronous replication process in which host writes to a consistency group comprising one or more storage volumes are mirrored from the source storage system 102S to the target storage system 102T as the host writes are made at the source storage system 102S.

Other types of replication arrangements can be used in other embodiments. For example, the storage systems may be configurable to operate in both asynchronous and synchronous replication modes, with transitions between the modes controlled by their respective instances of replication control logic 112S and 112T.

A given such asynchronous replication mode illustratively comprises a cycle-based asynchronous replication process in which a consistency group comprising one or more storage volumes is replicated from the source storage system 102S to the target storage system 102T over a plurality of asynchronous replication cycles.

Other examples of replication processes that can be used in illustrative embodiments include active-active replication, in which one of the storage systems operates as a "leader" relative to another one of the storage systems operating as a "follower" in implementing consistent synchronous writes to both storage systems. Such active-active replication is considered a type of synchronous replication as that term is broadly used herein.

The system 100 is illustratively configured to provide what is referred to herein as "efficient release of address lock waiters." For example, such efficient release of address lock waiters is illustratively performed as part of synchronous replication carried out between the source storage system 102S and the target storage system 102T. These and other operations related to efficient release of address lock waiters as disclosed herein are illustratively implemented at least in part by or otherwise under the control of the source and target instances of lock waiter release logic 114S and 114T. One or more such operations can be additionally or alternatively controlled by one or more other system components in other embodiments.

In accordance with the functionality for efficient release of address lock waiters, the source storage system 102S is configured to maintain a synchronous replication IO request list having a plurality of entries corresponding to respective synchronous replication IO requests, with a given such entry identifying at least a sender component and one or more address locks held by the corresponding synchronous replication IO request.

The source storage system 102S is further configured to detect a failure of a particular one of a plurality of sender components, to access the synchronous replication IO request list to identify one or more address locks held by at least one synchronous replication IO request previously sent by the failed sender component, and to release one or more address lock waiters that are waiting to obtain the one or more identified address locks.

The address lock waiters illustratively comprise respective ones of a plurality of other synchronous replication IO requests that are waiting to obtain the one or more identified address locks held by the at least one synchronous replication IO request previously sent by the failed sender component.

The synchronous replication IO requests are illustratively generated as part of the above-described synchronous replication process carried out between the source storage system 102S and the target storage system 102T using their respective instances of replication control logic 112S and 112T.

An illustrative example of a synchronous replication IO request list of the type described above is shown in FIG. 3 and will be described in more detail below. A given entry of a synchronous replication IO request list comprises respective fields identifying at least a sender component and one or more address locks held by the corresponding synchronous replication IO request. Each such address lock illustratively locks a particular designated address range, with the address range illustratively comprising a range of logical block addresses or LBAs. Other types of address locks can be used in other embodiments.

Additional or alternative fields can be included in the synchronous replication IO request list. For example, such other fields in some embodiments can comprise a field identifying one or more associated component resources to be released responsive to a failure of the sender component, and a release status field indicating whether or not the one or more associated component resources have been released, as disclosed in the above-cited U.S. patent application Ser. No. 16/654,189. In embodiments of this type, the synchronous replication IO request list can be updated as necessary in conjunction with release of the associated component resources by, for example, updating the release status field in order to mark the one or more associated component resources as released. Again, other types of additional or alternative fields can be used.

The one or more associated component resources to be released responsive to a failure of the sender component can comprise one or more buffers used in communicating with the sender component, one or more data structures utilized in conjunction with interaction with the sender component, or other types of resources. The term "associated component resources" is therefore intended to be broadly construed so as encompass, for example, resources that are allocated by a particular storage system component for interaction with another system component, where the latter component has failed subsequent to the allocation of resources for interaction with that component by the particular component.

It should be noted that the above-noted functionality for efficient release of address lock waiters described with reference to source storage system 102S can additionally or alternatively be implemented in target storage system 102T. The storage systems 102 in some embodiments therefore both implement substantially the same functionality for efficient release of address lock waiters via their respective instances of lock waiter release logic 114S and 114T.

One or both of the storage systems 102 are illustratively implemented as respective distributed storage systems, also referred to herein as clustered storage systems, in which each such storage system comprises a plurality of storage nodes each comprising a set of processing modules configured to communicate with corresponding sets of processing modules on other ones of the storage nodes. The sets of processing modules of the storage nodes of the source storage system collectively comprise at least a portion of the storage controller 108S or 108T of the storage system 102S or 102T. For example, in some embodiments the sets of processing modules of the storage nodes collectively comprise a distributed storage controller of the distributed storage system.

The source and target storage systems 102 in some embodiments comprise respective content addressable storage systems in which logical addresses of data pages are mapped to physical addresses of the data pages using respective content-based signatures that are generated from those data pages.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality. The address metadata in some embodiments comprises at least a portion of one or more logical layer mapping tables that map logical addresses of respective ones of the data pages of a storage volume to corresponding content-based signatures of the respective data pages. Examples of logical layer mapping tables and other metadata structures maintained by at least the storage controller 108T of target storage system 102T will be described elsewhere herein.

As indicated previously, the instances of replication control logic 112S and 112T are assumed to cooperate to implement a synchronous replication process, and in some embodiments collectively provide a replication engine of system 100 that can replicate one or more storage volumes from one of the storage systems 102 to the other one of the storage systems, and vice-versa. Accordingly, the designation of one of the storage systems 102 as the "source" and the other as the "target" can vary over time.

The replicated storage volume illustratively comprises at least one logical storage volume that is part of a consistency group subject to the ongoing replication process carried out between the source and target storage systems 102.

The term "storage volume" as used herein is intended to be broadly construed, and should not be viewed as being limited to any particular format or configuration. The term "consistency group" as used herein is also intended to be broadly construed, and may comprise one or more other storage volumes.

The synchronous replication IO request list is illustratively maintained by a particular one of the processing modules of the sets of processing modules of the respective storage nodes of the distributed storage system, and the sender components comprise respective other ones of the processing modules of the sets of processing modules of the respective storage nodes of the distributed storage system. Each of at least a subset of the processing modules of the sets of processing modules of the respective storage nodes of the distributed storage system can be configured to maintain a separate corresponding synchronous replication IO request list for that processing module.

It is assumed in some embodiments that the processing modules of a distributed storage controller are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller of the type described above can include control modules, data modules, routing modules and at least one management module. These and possibly other modules of the distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

The management module communicates with the control modules, and the control modules communicate with the data modules. In some embodiments, each of the storage nodes of the distributed storage system comprises one of the control modules and one of the data modules, as well as one or more additional modules including one of the routing modules. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Another example of a content addressable storage system configured to implement functionality for efficient release of address lock waiters will be described in conjunction with FIG. 4 below.

The processing modules of a given distributed storage controller as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

In some embodiments, certain ones of the above-described mapping tables are maintained by particular modules of a distributed storage controller. For example, the mapping tables maintained by the control modules illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules may further comprise additional components such as respective messaging interfaces that are utilized by the control modules to generate control-to-routing messages for transmission to the routing modules, and to process routing-to-control messages received from the routing modules. Such messaging interfaces can also be configured to generate messages for transmission to the management module and to process instructions and other messages received from the management module.

The data modules comprise respective control interfaces. These control interfaces support communication between the data modules and corresponding ones of the control modules. Also included in the data modules are respective SSD interfaces. These SSD interfaces support communications with corresponding ones of the storage devices 106 of the distributed storage system.

The above-described processing module arrangements are presented by way of example only, and can be varied in other embodiments.

In some embodiments, a given data path of one of the storage systems 102 comprises a control module, a data module and a routing module that are configured to handle different stages of the data path. Most synchronous replication mirroring from the source storage system 102S to the target storage system 102T involves the control modules. For example, a given synchronous replication IO request can comprise a write request received in a control module from a routing module. In this case, the routing module is the sender of the write request, and the resources allocated by the control module include one or more buffers allocated for communication between the control module and the routing module.

Such resources are examples of what are more generally referred to herein as "associated component resources" to be released if the routing module were to fail. Each message sent from a first processing module to a second processing module can have an associated buffer in the first processing module that is specifically allocated for that message. A given such message illustratively carries all of the relevant parameters of its corresponding IO request, such as, for example, logical storage volume identifier, starting logical address offset, number of logical address offsets, type of request (e.g., read or write), buffer descriptors, actual data to be written in the case of a write request, etc. An additional buffer is illustratively allocated for a reply from the control module back to the routing module. Other types of IO requests, messages, parameters and allocated resources can be used in other embodiments.

In maintaining the synchronous replication IO request list, the storage controller 108S of the source storage system 102S receives IO requests, and for each of the received IO requests, determines if the IO request is a synchronous replication IO request. Responsive to the IO request being a synchronous replication IO request, a corresponding entry is created in the synchronous replication IO request list.

Additionally or alternatively, maintaining the synchronous replication IO request list comprises periodically scanning through the entries of the list, and for each of the entries of the list, determining if the corresponding sender component has failed. Responsive to an affirmative determination that the corresponding sender component has failed, one or more associated address lock waiters are released and the synchronous replication IO request list is updated. The periodic scanning is performed in each of a plurality of iterations triggered in accordance with respective iteration intervals. For example, the iteration intervals in some embodiments are on the order of 100 milliseconds, although other values can be used. Multiple entries of the synchronous replication IO request list may be removed between successive iterations of the periodic scanning responsive to successful completion of synchronous replication of their respective corresponding IO requests.

Other types of operations are performed in order to maintain the synchronous replication request list. For example, maintaining the synchronous replication IO request list illustratively further comprises receiving an indication that synchronous replication of a particular IO request has successfully completed, and responsive to the received indication, removing a corresponding entry from the synchronous replication IO request list.

In some embodiments, releasing one or more address lock waiters that are waiting to obtain the one or more identified address locks comprises, for each of the one or more identified address locks, identifying a corresponding lock object for the address lock, identifying a queue of one or more address lock waiters associated with the identified lock object, and releasing each address lock waiter in the queue.

Additionally or alternatively, releasing one or more address lock waiters that are waiting to obtain the one or more identified address locks illustratively comprises, for each of the one or more address lock waiters, resuming a corresponding synchronous replication IO request, and indicating a lock acquisition failure for the corresponding synchronous replication IO request in conjunction with the resuming of that request.

These and other operations associated with maintaining the synchronous replication IO request list are illustratively performed at least in part by or under the control of the lock waiter release logic 114S. Again, similar operations relating to a synchronous replication IO request list can be performed in the target storage system 102T at least in part by or under the control of the lock waiter release logic 114T.

In some embodiments, an example process for efficient release of address lock waiters during synchronous replication may be more particularly configured in the following manner.

It is assumed in the context of this example process and other illustrative embodiments herein that the address locks are utilized to guarantee atomicity for execution of IO requests in the storage systems 102. For example, a given processing module receiving a first IO request from another processing module will generally lock the address range targeted by the first IO request prior to performing the associated read or write operation. In this manner, if a second IO request arrives at the given processing module targeting at least a portion of the locked address range, the second IO request will be suspended in order to wait for the address lock to be released by the first IO request. The second IO request may be viewed as an example of what is more generally referred to herein as an "address lock waiter." It illustratively waits in a queue established for the corresponding "lock object" which may be a particular range of logical addresses that is subject to the corresponding address lock. The second IO request cannot resume until the address lock is released by the first IO request. There may be multiple IO requests that are suspended and waiting in the queue for a given address lock at any given time. Multiple such queues of address lock waiters and their associated address lock waiter release operations in some embodiments are implemented at least in part by operating system (OS) synchronization services of a distributed storage controller.

In the presence of ongoing synchronous replication, mirroring of one or more of these IO requests from the source storage system 102S to the target storage system 102T is done under the same address lock, thus forcing other in-flight IO requests waiting for the address lock to wait for a longer time than they would in a non-replication case. These other in-flight IO requests waiting for an address lock that is held by a synchronous replication IO request may prevent fast release of associated resources responsive to a processing module failure, and thereby significantly slow the overall failure recovery process.

It should be noted in this regard that address lock granularity in a given storage system may be larger than the size of a particular IO request. For example, a storage system may have an address lock granularity of 16K, illustratively corresponding to a native page size in the storage system, while some IO requests may have a smaller size, such as 4K. It is therefore possible that several IO requests may be waiting to acquire lock for the same 16K address range even if those IO requests are directed to different addresses within that range.

It is further assumed in the context of this example process that various resources have been allocated by each of a plurality of processing modules of a distributed storage controller for use in communication or other interaction with other processing modules of the distributed storage controller. Such resources include, for example, buffers for sending and receiving messages and various data structures. A failure of a given one of the processing modules is a type of HA event that must be dealt with in order to ensure that the HA goals of the storage system are achieved. Responsive to such a failure, it is generally desirable for each of the non-failed processing modules to release the resources that they had previously allocated for interaction with processing module that has now failed, for example, so as to allow the non-failed processing modules to initiate communication with a newly-launched replacement processing module. However, in the presence of an ongoing synchronous replication process, such resources can be reserved for a relatively long time (e.g., a few seconds), and their delayed release can prevent successful completion of HA event handling, or even cause such handling to fail.

More particularly, in a normal IO flow in the absence of any sender failures or other HA events, a given processing module acknowledges its completion of an IO request back to the sender of that IO request, which in the present example is another one of the processing modules. In order to provide such an acknowledgment, the processing module maintains its allocation of resources for that sender for the full period of its handling of the IO request, including the mirroring of that request to the target storage system in conjunction with the ongoing synchronous replication process. In an HA event in which the sender fails, the given processing module cannot acknowledge completion of the IO request back to that failed sender, but it is important that the IO request mirroring of the synchronous replication mode continue while the storage system is also dealing with the HA event.

The process in the present example advantageously allows the storage system to continue handling synchronous replication IO requests during an HA event, without "tripping" or otherwise interrupting the synchronous replication mode, while also efficiently releasing address lock waiters, thereby ensuring fast recovery from the HA event. All in-flight IO messages related to synchronous replication that are received by non-failed processing modules from a failed processing module can be handled quickly and effectively.

In addition, such embodiments do not undermine the performance of the storage system in handling normal IO requests not related to synchronous replication, or in handling synchronous replication IO requests when the storage system is "healthy" and not currently experiencing any sender failures or other HA events.

Moreover, lock fairness is advantageously preserved in the present example and other illustrative embodiments disclosed herein. More specifically, address lock waiters should be able to acquire lock in the same order that they requested it, in order to prevent deadlocks while waiting for lock. Illustrative embodiments herein ensure that such fairness is preserved in handling normal non-replication IO requests as well as in handling synchronous replication IO requests in a healthy storage system not currently experiencing any HA events.

The example process in this embodiment illustratively includes the following steps for a given processing module:

1. In conjunction with initiation of the given processing module, an empty synchronous replication in-flight IO list is created for that processing module. As described elsewhere herein, the list maintains information for in-flight IO requests received by the given processing module from other processing modules, illustratively relating to in-flight IO requests to be mirrored from the source storage system 102S to the target storage system 102T as part of the ongoing synchronous replication process in the manner previously described. In this example, the list is denoted sync_msgs_list.

2. Each entry added to sync_msgs_list includes information about a particular in-flight IO request, such as, for example, the sender, illustratively another processing module, that sent this particular IO request to the given processing module, as well as one or more address ranges locked by the particular IO request. Such address ranges locked by an IO request from a sender are examples of what are also referred to herein as respective address locks that are "held" by that IO request. Additional information that can be included in the entry for the IO request illustratively comprises a pointer to particular messaging resources to be released by the given processing module in the event of a crash or other failure of the other processing module, and a release status indicator that indicates whether or not those resources have been released. One possible configuration of sync_msgs_list is described below in conjunction with FIG. 3, although other types of lists having different arrangements of entries and fields can be used.

3. An iterator thread is created in order to periodically scan through the entries in sync_msgs_list. On each such iteration, the iterator thread checks for each entry whether or not its corresponding sender has failed.

4. In the event that the iterator thread determines that at least one of the senders has failed, it recognizes that there is an HA event in the storage system. As a result of the HA event, there may be one or more address lock waiters that are waiting for one or more address locks held by at least one synchronous replication IO request previously sent by at least one failed sender prior to its failure.

5. Responsive to detection of at least one failed sender among the entries in sync_msgs_list, another scan of sync_msgs_list is performed, in which all of the address lock waiters that are waiting for address locks held by synchronous replication IO operations previously sent by any of the senders are released, and sync_msgs_list is updated. In embodiments in which the entries of sync_msgs_list further include fields identifying resources to be released upon sender failure and an associated release status indicator, the identified resources are released, and sync_msgs_list is updated to indicate that those resources have been released. The corresponding entry or entries can be removed from sync_msgs_list prior to the next iteration of the iterator thread.

A similar process is assumed to be implemented for each of a plurality of other processing modules of the source storage system.

As indicated above, releasing one or more address lock waiters may comprise, for example, identifying a corresponding lock object for an address lock, identifying a queue of one or more address lock waiters associated with the identified lock object, and releasing each address lock waiter in the queue. Releasing a given such address lock waiter illustratively comprises resuming the corresponding synchronous replication IO request, while also indicating a lock acquisition failure for that request. The queues of address lock waiters and the associated release operations in some embodiments are implemented at least in part by OS synchronization services of a distributed storage controller.

For example, OS synchronization services implementing address lock functionality are illustratively configured to retrieve a corresponding lock object for each address lock, iterate over its queue of waiters, and release those waiters by resuming them with an indication of failure in acquiring the lock. Such address lock waiters can then release messaging resources or other associated resources that they previously allocated to the failed sender and retry related IO requests after resolution of the HA event.

An IO request handling sequence in the process of the present example illustratively includes the following steps:

1. An IO request received by a given processing module is first handled locally on the source storage system 102S. There is no impact on non-replication IO requests processed by the source storage system 102S.

2. If it is determined that this in-flight IO request is a synchronous replication IO request that needs to be mirrored to the target storage system 102T, an entry is created for the IO request in sync_msgs_list in the manner previously described.

3. When a synchronous replication IO request successfully completes after mirroring of that IO request to the target storage system 102T, the corresponding entry can be removed from sync_msgs_list. In embodiments in which the entries of sync_msgs_list further include fields identifying resources to be released upon sender failure and an associated release status indicator, the entry removal process first checks the release status indicator to determine if the resources have already been released, and if the resources have already been released, no further release action needs to be taken, and the given processing module does not attempt to reply to the sender. If the resources have not already been released, the given processing module can reply to the sender using those resources, before the resources are released, assuming there has been no detection of a failure of that sender.

In some embodiments, each IO request is handled within a relatively short amount of time, such as hundreds of microseconds (μsec), while the iterator thread used to periodically scan sync_msgs_list "wakes up" to perform its scan for a given iteration on relatively long intervals, such as about every 100 milliseconds (msec). As a result, there will typically be only a small number of entries in sync_msgs_list for the iterator thread to scan through, as most IO requests will have already had their entries added to and subsequently removed from sync_msgs_list in between the iterations of the iterator thread. Accordingly, the introduction of the iterator thread into the time-sensitive data path that includes the given processing module has little or no adverse impact on the overall performance of a healthy storage system.

Since in the present example process and other illustrative embodiments address lock waiters are released by the iterator thread only during a detected HA event, lock fairness is preserved for a healthy system and non-replication IO use cases. At the same time, in presence of an HA event, the iterator thread allows for fast handling of the HA event while seamlessly continuing with the proper handling of synchronous replication in-flight IO requests. As noted above, such arrangements avoid the need to trip the synchronous replication mode. Such tripping of the synchronous replication mode is highly undesirable as it may, for example, violate compliance policies of the storage systems.

Additional or alternative steps may be used in such a process in other embodiments. Also, the ordering of the steps can be varied, and different portions of the process can be performed at least in part in parallel with one another.

The above-described operations carried out in conjunction with a process for efficient release of address lock waiters involving the storage systems 102 are illustratively performed at least in part under the control of the replication engine comprising the multiple instances of replication control logic 112.

The storage systems 102 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108, storage volumes 110, replication control logic 112 and lock waiter release logic 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for efficient release of address lock waiters can be implemented in one or more host devices, or partially in a host device and partially in a storage system. Accordingly, illustrative embodiments are not limited to arrangements in which all such functionality is implemented in source and target storage systems or a host device, and therefore encompass various hybrid arrangements in which the functionality is distributed over one or more storage systems and one or more associated host devices, each comprising one or more processing devices.

As another example, it is possible in some embodiments that the source storage system and the target storage system can comprise the same storage system. In such an arrangement, a replication process is illustratively implemented to replicate data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements a process for efficient release of address lock waiters in conjunction with ongoing synchronous replication.

The process as illustrated in FIG. 2 includes steps 200 through 212, and is suitable for use in system 100 but is more generally applicable to a wide variety of other types of information processing systems comprising at least one storage system implementing functionality for efficient release of address lock waiters.

In step 200, a processing module receives an IO request, illustratively from another processing module of a distributed storage controller. For example, the IO request can comprise a write request received in a control module of the distributed storage controller from a routing module of the distributed storage controller. Numerous other IO requests can be received in one processing module from another processing, and the term "IO request" is therefore intended to be broadly construed herein.

In step 202, a determination is made regarding the particular type of IO request that was received. For purposes of this step of the process, it is assumed that there are only two different types of IO requests, namely, IO requests that are associated with an ongoing synchronous replication process, and those that are not associated with the ongoing synchronous replication process. In the context of the FIG. 2 embodiment, the former are referred to as synchronous replication ("SR") requests, and the latter are referred to as non-SR requests. If the received IO request is an SR request, the process moves to step 204, and if the received IO request is a non-SR request, the process moves to step 206.

In step 204, a corresponding entry is created for the received IO request in a synchronous replication in-flight IO list maintained by or for the first processing module. The synchronous replication in-flight IO list is an example of what is more generally referred to herein as a "synchronous replication IO request list." The list can be implemented in the form of a table or other data structure maintained in a memory of the processing module. Other similar synchronous replication IO lists can be maintained for respective other processing modules of a distributed storage controller.

In step 206, no corresponding entry is created for the received IO request in the synchronous replication in-flight IO list.

It should be noted that steps 200 through 206 could be iterated for respective ones of multiple IO requests, with the synchronous replication in-flight IO list being updated in each instance of step 204 to include a corresponding entry for each of the IO requests that is determined to be an SR request. Also, different portions of the process can overlap with other portions of the process. For example, additional iterations of steps 200 through 206 can be initiated while previous iterations of steps 208 through 212 are still in progress. Accordingly, the steps are shown in sequential order for clarity and simplicity of illustration only, and certain steps can at least partially overlap with other steps.

In step 208, a decision is made as to whether or not a sender failure has been detected by the processing module. Such a sender failure can be detected in any of a number of different ways. For example, the processing module can determine based on failures of one or more messages directed to another processing module that the other processing module has failed. Additionally or alternatively, such a failure can be communicated to the processing module from a management module or other non-failed processing module of the distributed storage controller. If a sender failure has been detected by the processing module, the process moves to step 210 as indicated, and otherwise moves to step 212.

In step 210, the processing module accesses the synchronous replication in-flight IO list to determine the address locks held by the synchronous replication in-flight IO requests, releases any corresponding address lock waiters, and updates the synchronous replication in-flight IO list. The process then returns to step 200 to handle additional received IO requests.

In step 212, a determination is made as to whether or not one or more synchronous replication in-flight IOs have successfully completed. Responsive to an affirmative determination, the process moves to step 210, and otherwise returns to step 200 to handle additional received IO requests.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for efficient release of address lock waiters. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient release processes for respective different processing modules or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

FIG. 3 shows an example of a synchronous replication in-flight IO list 300 utilized in implementing efficient release of address lock waiters during synchronous replication in accordance with the FIG. 2 process. In this embodiment, the synchronous replication in-flight IO list is maintained in the form of a table, although other types of data structures can be used in other embodiments.

It is further assumed that the synchronous replication in-flight IO list is maintained by and for a particular one of a plurality of processing modules of a distributed storage controller, such as a particular control module, more particularly denoted as processing module i in the figure, to provide efficient release of address lock waiters for one or more address locks held by synchronous replication IO requests from other processing modules of the distributed storage controller that are senders relative to processing module i.

The synchronous replication in-flight IO list 300 more particularly comprises a plurality of entries for respective IO requests associated with an ongoing synchronous replication process. Such entries are illustratively created via respective iterations of step 204 of the FIG. 2 process in the manner previously described. Each of the entries of the synchronous replication in-flight IO list 300 comprises respective fields identifying at least a sender component and one or more address locks held by a synchronous replication IO request previously sent by that sender component.

More particularly, for each of a plurality of synchronous replication in-flight IOs denoted IO 1, IO 2, . . . IO N, the entries include respective sender IDs, and one or more address ranges for respective address locks held by the corresponding synchronous replication in-flight IO. Multiple ones of the in-flight IOs can be received from the same sender.

Numerous other types and arrangements of entries and fields can be used, and the term "synchronous replication IO request list" as used herein is therefore intended to be broadly construed. For example, fields for associated resources to be released on sender failure and release status of those resources can be included in the synchronous replication in-flight IO list 300, as previously described.

In some embodiments, the storage system comprises a clustered content addressable storage system configured to incorporate functionality for efficient release of address lock waiters as disclosed herein. A clustered content addressable storage system is also referred to herein as a distributed content addressable storage system.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, and accordingly is assumed to be coupled to the other one of the storage systems 102 and to one or more host devices of a computer system within information processing system 100.

Although it is assumed that both the source storage system 102S and the target storage system 102T are content addressable storage systems in some embodiments, other types of storage systems can be used for one or both of the source storage system 102S and the target storage system 102T in other embodiments. For example, it is possible that at least one of the storage systems 102 in an illustrative embodiment need not be a content addressable storage system and need not include an ability to generate content-based signatures. In such an embodiment, the signature generator and other parts of the functionality for efficient release of address lock waiters of the one or more storage systems can be implemented in a host device.

The storage controller 408 in the present embodiment is configured to implement functionality for efficient release of address lock waiters of the type previously described in conjunction with FIGS. 1 through 3. For example, the content addressable storage system 405 illustratively participates as a source storage system in a synchronous replication process with a target storage system that may be implemented as another instance of the content addressable storage system 405.

The storage controller 408 includes distributed modules 412 and 414, which are configured to operate in a manner similar to that described above for respective corresponding replication control logic 112 and lock waiter release logic 114 of the storage controllers 108 of system 100. Module 412 is more particularly referred to as distributed replication control logic, and illustratively comprises multiple replication control logic instances on respective ones of a plurality of distinct nodes, with the multiple replication control logic instances comprising at least a portion of a replication engine configured to perform process operations associated with synchronous replication. Module 414 more particularly comprises distributed lock waiter release logic with different instances thereof also being implemented on respective ones of the distinct nodes.

Figure 4:
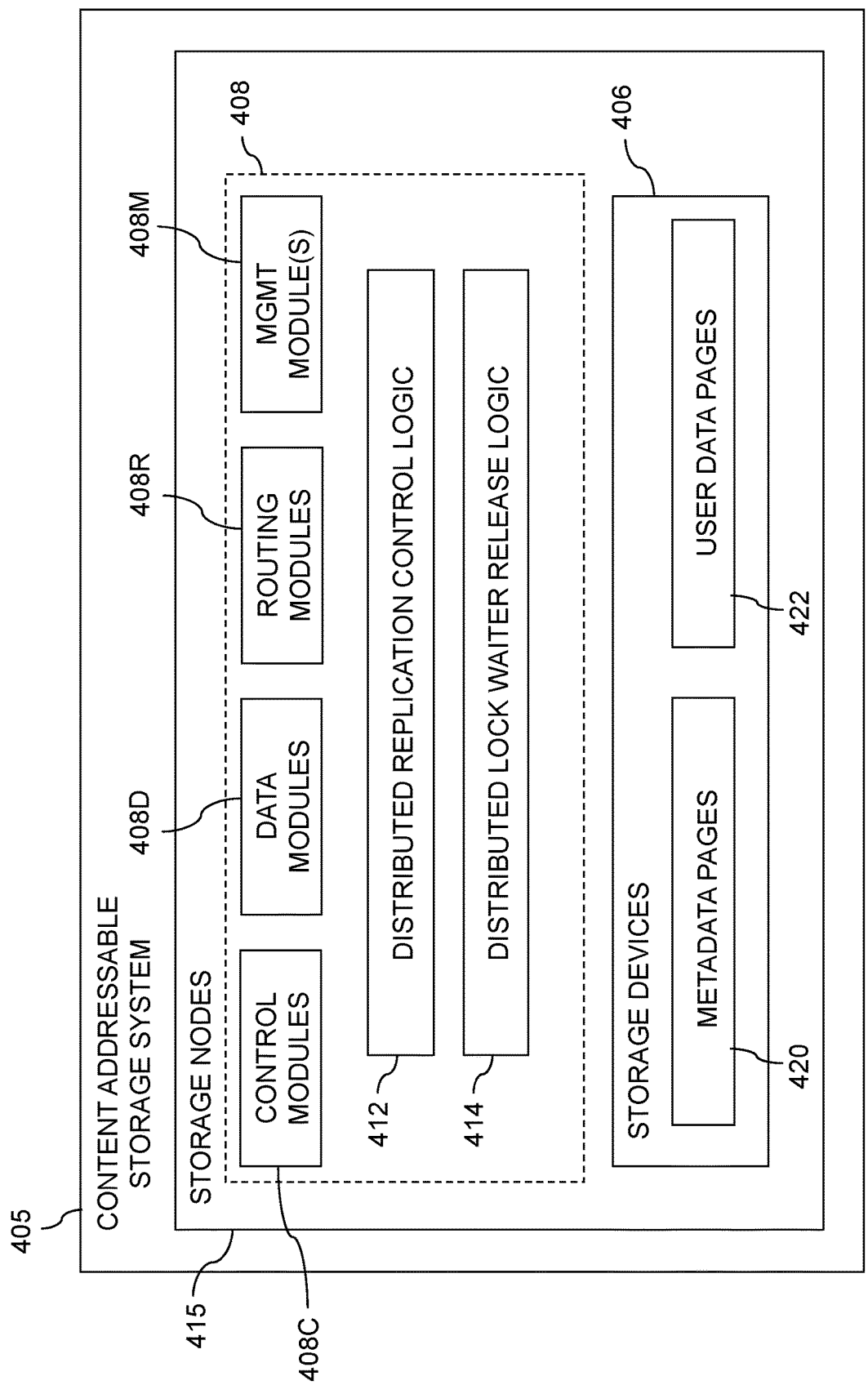
FIG. 4 illustrates a portion of a distributed storage controller of a content addressable storage system showing one possible arrangement implementing efficient release of address lock waiters during synchronous replication.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as TCP/IP and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the functionality for efficient release of address lock waiters of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The functionality for efficient release of address lock waiters provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement a synchronous replication process.

By way of example, in some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller in this example is configured to group consecutive pages into page groups, to arrange the page groups into slices, and to assign the slices to different ones of the control modules 408C. For example, if there are 1024 slices distributed evenly across the control modules 408C, and there are a total of 16 control modules in a given implementation, each of the control modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The data modules 408D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 408C but are accessed using the data modules 408D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 408C, data modules 408D and routing modules 408R of the storage nodes 415 communicate with one another over a high-speed internal network such as an InfiniBand network. The control modules 408C, data modules 408D and routing modules 408R coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the content addressable storage system 405. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement functionality for efficient release of address lock waiters in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein.

Alternative arrangements of these and other storage node processing modules of a distributed storage controller in a content addressable storage system can be used in other embodiments.

Illustrative embodiments of a storage system with functionality for efficient release of address lock waiters as disclosed herein can provide a number of significant advantages relative to conventional arrangements.

For example, some of these embodiments advantageously provide efficient release of one or more synchronous replication IO requests that are each waiting for an address lock held by a synchronous replication IO request sent by a failed processing module prior to its failure. Such address lock waiters can comprise other synchronous replication IO requests sent or received by control modules, routing modules or other types of processing modules of a distributed storage controller.

Illustrative embodiments advantageously address and overcome issues that might otherwise negatively impact the ability of a storage system to respond to the failure, thereby ensuring that the storage system can meet its HA goals.

For example, some embodiments advantageously allow a storage system to continue handling synchronous replication IO requests during an HA event, without "tripping" or otherwise interrupting the synchronous replication mode, while also efficiently releasing address lock waiters, thereby ensuring fast recovery from the HA event.

In addition, lock fairness is advantageously preserved by illustrative embodiments disclosed herein.

Moreover, such embodiments do not undermine the performance of the storage system in handling normal IO requests not related to synchronous replication, as well as in handling synchronous replication IO requests when the storage system is "healthy" and not currently experiencing any sender failures or other HA events.

Accordingly, illustrative embodiments allow efficient release of address lock waiters for in-flight synchronous replication IO requests responsive to an HA event while preserving lock fairness and without any interruption of the ongoing synchronous replication process. Fast and efficient HA recovery is therefore provided during synchronous replication with minimal impact on a healthy storage system or non-replication IO use cases.

Functionality for efficient release of address lock waiters as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for efficient release of address lock waiters will now be described in greater detail with reference to FIGS. 5 and 6. Although described in the context of system 100, these platforms may also be used to implement at least portions of other information processing systems in other embodiments.

Figure 5:
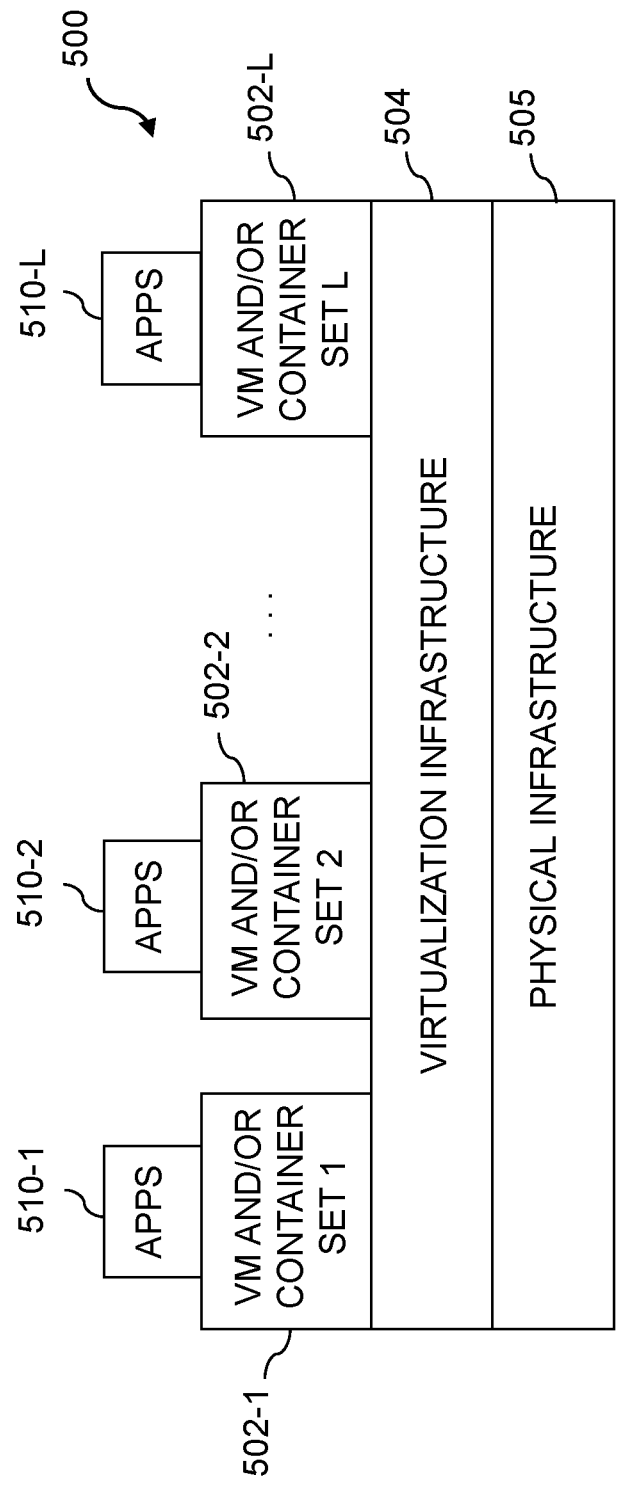
FIGS. 5 and 6 show examples of processing platforms that may be utilized to implement at least a portion of an information processing system in illustrative embodiments.
Figure 6:
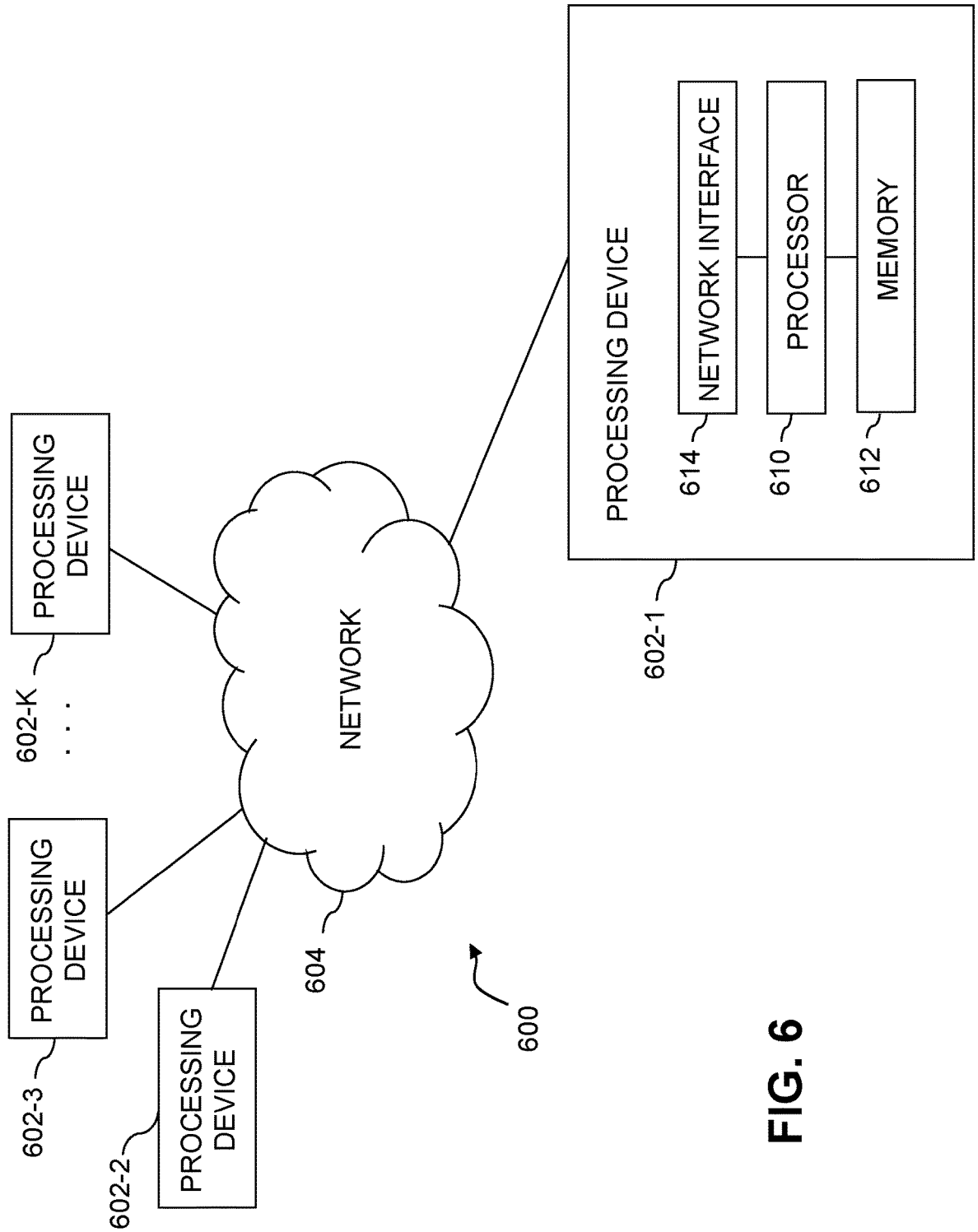

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for efficient release of address lock waiters of the type described above for one or more processes running on a given one of the VMs. For example, each of the VMs can implement replication control logic instances, lock waiter release logic instances, and/or other components for supporting functionality for efficient release of address lock waiters in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for efficient release of address lock waiters of the type described above. For example, a container host device supporting multiple containers of one or more container sets can implement one or more instances of replication control logic, lock waiter release logic and/or other components for supporting functionality for efficient release of address lock waiters in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient release of address lock waiters of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication control logic, lock waiter release logic, synchronous replication IO request lists and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to maintain a synchronous replication input-output request list having a plurality of entries corresponding to respective synchronous replication input-output requests, a given such entry identifying at least a sender component and one or more address locks held by the corresponding synchronous replication input-output request;
to detect a failure of a particular one of a plurality of sender components;
to access the synchronous replication input-output request list to identify one or more address locks held by at least one synchronous replication input-output request previously sent by the failed sender component; and
to release one or more address lock waiters that are waiting to obtain the one or more identified address locks;
wherein the synchronous replication input-output requests comprise input-output requests generated in accordance with a synchronous replication process carried out between a first storage system and a second storage system to replicate one or more logical storage volumes from the first storage system to the second storage system, at least the first storage system comprising a distributed storage system;
wherein the at least one processing device comprises a particular one of a plurality of storage nodes of the distributed storage system, each such storage node comprising a set of processing modules configured to communicate with corresponding sets of processing modules on other ones of the storage nodes, the sets of processing modules of the storage nodes of the distributed storage system collectively comprising at least a portion of a storage controller of the distributed storage system;
wherein maintaining the synchronous replication input-output request list comprises:
periodically scanning through the entries of the list; and
for each of the entries of the list:
determining if the corresponding sender component has failed;
wherein responsive to an affirmative determination that the corresponding sender component has failed, one or more associated address lock waiters are released and the synchronous replication input-output request list is updated;
wherein multiple entries of the synchronous replication input-output request list are removed between successive iterations of the periodic scanning responsive to successful completion of synchronous replication of their respective corresponding input-output requests; and
wherein the synchronous replication input-output request list is maintained by a particular one of the processing modules of the sets of processing modules of the respective storage nodes of the distributed storage system and the sender components comprise respective other ones of the processing modules of the sets of processing modules of the respective storage nodes of the distributed storage system.

2. The apparatus of claim 1 wherein the address lock waiters comprise respective ones of a plurality of other synchronous replication input-output requests that are waiting to obtain the one or more identified address locks held by the at least one synchronous replication input-output request previously sent by the failed sender component.

3. The apparatus of claim 1 wherein each of at least a subset of the processing modules of the sets of processing modules of the respective storage nodes of the distributed storage system maintains a separate corresponding synchronous replication input-output request list for that processing module.

4. The apparatus of claim 1 wherein maintaining the synchronous replication input-output request list comprises:
receiving input-output requests; and
for each of the received input-output requests:
determining if the input-output request is a synchronous replication input-output request; and
responsive to the input-output request being a synchronous replication input-output request, creating a corresponding entry in the synchronous replication input-output request list.

5. The apparatus of claim 1 wherein the periodic scanning is performed in each of a plurality of iterations triggered in accordance with respective iteration intervals.

6. The apparatus of claim 5 wherein the iteration intervals are on the order of 100 milliseconds.

7. The apparatus of claim 1 wherein maintaining the synchronous replication input-output request list comprises:
receiving an indication that synchronous replication of a particular input-output request has successfully completed; and
responsive to the received indication, removing a corresponding entry from the synchronous replication input-output request list.

8. The apparatus of claim 1 wherein releasing one or more address lock waiters that are waiting to obtain the one or more identified address locks comprises, for each of the one or more identified address locks:
identifying a corresponding lock object for the address lock;
identifying a queue of one or more address lock waiters associated with the identified lock object; and
releasing each address lock waiter in the queue.

9. The apparatus of claim 1 wherein releasing one or more address lock waiters that are waiting to obtain the one or more identified address locks comprises, for each of the one or more address lock waiters:
resuming a corresponding synchronous replication input-output request; and
indicating a lock acquisition failure for the corresponding synchronous replication input-output request in conjunction with the resuming of that request.

10. The apparatus of claim 1 wherein the sets of processing modules each comprise at least a routing module and a control module with the routing modules and the control modules of the sets of processing modules being interconnected in a full mesh network.

11. The apparatus of claim 1 wherein a given one of the synchronous replication input-output requests comprises a write request received in a control module of a first one of the storage nodes from a routing module of a second one of the storage nodes.

12. The apparatus of claim 11 wherein the control module is configured to allocate at least a first one of a plurality of buffers for the given synchronous replication input-output request received from the routing module and to allocate at least one additional buffer of the plurality of buffers for a corresponding reply to be sent from the control module to the routing module.

13. A method implemented by at least one processing device comprising a processor coupled to a memory, comprising:
   maintaining a synchronous replication input-output request list having a plurality of entries corresponding to respective synchronous replication input-output requests, a given such entry identifying at least a sender component and one or more address locks held by the corresponding synchronous replication input-output request;
   detecting a failure of a particular one of a plurality of sender components;
   accessing the synchronous replication input-output request list to identify one or more address locks held by at least one synchronous replication input-output request previously sent by the failed sender component; and
   releasing one or more address lock waiters that are waiting to obtain the one or more identified address locks;
   wherein the synchronous replication input-output requests comprise input-output requests generated in accordance with a synchronous replication process carried out between a first storage system and a second storage system to replicate one or more logical storage volumes from the first storage system to the second storage system, at least the first storage system comprising a distributed storage system;
   wherein the at least one processing device comprises a particular one of a plurality of storage nodes of the distributed storage system, each such storage node comprising a set of processing modules configured to communicate with corresponding sets of processing modules on other ones of the storage nodes, the sets of processing modules of the storage nodes of the distributed storage system collectively comprising at least a portion of a storage controller of the distributed storage system;
   wherein maintaining the synchronous replication input-output request list comprises:
   periodically scanning through the entries of the list; and
   for each of the entries of the list:
   determining if the corresponding sender component has failed;
   wherein responsive to an affirmative determination that the corresponding sender component has failed, one or more associated address lock waiters are released and the synchronous replication input-output request list is updated;
   wherein multiple entries of the synchronous replication input-output request list are removed between successive iterations of the periodic scanning responsive to successful completion of synchronous replication of their respective corresponding input-output requests; and
   wherein the synchronous replication input-output request list is maintained by a particular one of the processing modules of the sets of processing modules of the respective storage nodes of the distributed storage system and the sender components comprise respective other ones of the processing modules of the sets of processing modules of the respective storage nodes of the distributed storage system.

14. The method of claim 13 wherein the address lock waiters comprise respective ones of a plurality of other synchronous replication input-output requests that are waiting to obtain the one or more identified address locks held by the at least one synchronous replication input-output request previously sent by the failed sender component.

15. The method of claim 13 wherein releasing one or more address lock waiters that are waiting to obtain the one or more identified address locks comprises, for each of the one or more identified address locks:
   identifying a corresponding lock object for the address lock;
   identifying a queue of one or more address lock waiters associated with the identified lock object; and
   releasing each address lock waiter in the queue.

16. A computer program product comprising a non-transitory processor-readable storage medium having stored therein program code of one or more software programs, wherein the program code when executed by at least one processing device causes the at least one processing device:
   to maintain a synchronous replication input-output request list having a plurality of entries corresponding to respective synchronous replication input-output requests, a given such entry identifying at least a sender component and one or more address locks held by the corresponding synchronous replication input-output request;
   to detect a failure of a particular one of a plurality of sender components;
   to access the synchronous replication input-output request list to identify one or more address locks held by at least one synchronous replication input-output request previously sent by the failed sender component; and
   to release one or more address lock waiters that are waiting to obtain the one or more identified address locks;
   wherein the synchronous replication input-output requests comprise input-output requests generated in accordance with a synchronous replication process carried out between a first storage system and a second storage system to replicate one or more logical storage volumes from the first storage system to the second storage system, at least the first storage system comprising a distributed storage system;
   wherein the at least one processing device comprises a particular one of a plurality of storage nodes of the distributed storage system, each such storage node comprising a set of processing modules configured to communicate with corresponding sets of processing modules on other ones of the storage nodes, the sets of processing modules of the storage nodes of the distributed storage system collectively comprising at least a portion of a storage controller of the distributed storage system;
   wherein maintaining the synchronous replication input-output request list comprises:

periodically scanning through the entries of the list; and for each of the entries of the list:

determining if the corresponding sender component has failed;

wherein responsive to an affirmative determination that the corresponding sender component has failed, one or more associated address lock waiters are released and the synchronous replication input-output request list is updated;

wherein multiple entries of the synchronous replication input-output request list are removed between successive iterations of the periodic scanning responsive to successful completion of synchronous replication of their respective corresponding input-output requests; and wherein the synchronous replication input-output request list is maintained by a particular one of the processing modules of the sets of processing modules of the respective storage nodes of the distributed storage system and the sender components comprise respective other ones of the processing modules of the sets of processing modules of the respective storage nodes of the distributed storage system.

17. The computer program product of claim 16 wherein the address lock waiters comprise respective ones of a plurality of other synchronous replication input-output requests that are waiting to obtain the one or more identified address locks held by the at least one synchronous replication input-output request previously sent by the failed sender component.

18. The computer program product of claim 16 wherein releasing one or more address lock waiters that are waiting to obtain the one or more identified address locks comprises, for each of the one or more identified address locks:

identifying a corresponding lock object for the address lock;

identifying a queue of one or more address lock waiters associated with the identified lock object; and releasing each address lock waiter in the queue.

19. The computer program product of claim 16 wherein each of at least a subset of the processing modules of the sets of processing modules of the respective storage nodes of the distributed storage system maintains a separate corresponding synchronous replication input-output request list for that processing module.

20. The computer program product of claim 16 wherein maintaining the synchronous replication input-output request list comprises:

receiving input-output requests; and for each of the received input-output requests:

determining if the input-output request is a synchronous replication input-output request; and responsive to the input-output request being a synchronous replication input-output request, creating a corresponding entry in the synchronous replication input-output request list.

* * * * *